Aug. 21, 1951  E. M. SPLAINE ET AL  2,565,441
SPECTACLE CASE
Filed Sept. 23, 1948

INVENTOR.
EDWARD M. SPLAINE
BENJAMIN GROSVENOR
BY
Louis L. Gagnon
ATTORNEY

Patented Aug. 21, 1951

2,565,441

UNITED STATES PATENT OFFICE 2,565,441

SPECTACLE CASE

Edward M. Splaine, Southbridge, Mass., and Benjamin Grosvenor, Pomfret, Conn., assignors to American Optical Company, Southbridge, Mass., a voluntary association of Massachusetts Application September 23, 1948, Serial No. 50,676

10 Claims. (Cl. 220—31)

This invention relates to spectacle cases and has particular reference to spectacle cases of the type embodying sheet metal pocket and cover portions hingedly connected together and covered with leather, fabric or similar covering material.

One of the important objects of the invention is the provision of a spectacle case embodying pocket and cover portions each formed of sheet metal and connected together for movement with respect to one another by an improved hinge construction.

Another important object of the invention is to provide a spectacle case of the above character with a hinge construction embodying projections struck out of the hinge and projecting through openings in the case pocket and cover portions, the projections being thereafter folded so as to reside in adjacent recesses formed in the said case portions and present a substantially flush, even surface.

Another object is to provide a spectacle case of the above character with a hinge construction wherein the hinge and the adjacent portions of the case pocket and cover are provided with interfitting recesses and protrusions assuring positive location of the parts with respect to one another.

Another object is the provision of a spectacle case of the above character embodying a hinge having stops formed integral therewith for limiting the open position of the case cover, the stops being entirely independent of the spring tension device used for yieldingly urging the parts of the case into open or closed relationship.

Another object is to provide a spectacle case of the above character embodying a hinge and inner and outer coverings, the parts forming the hinge being so articulated that the portions of the hinge which are visible when the case is closed form a continuous uninterrupted hinge line on the exterior of the case.

Another object is the provision of a spectacle case of the above character having a hinge coupling the cover and pocket portions thereof, which hinge is provided with a tension spring member carried by the portion of the hinge connected to one of the case body portions and a connecting clip member anchored to the portion of the hinge connected to the other of the case body portions, said clip member also being connected to said spring member, the portion of the hinge carrying the spring member being provided with spaced ribs adapted to space the spring member and adjacent end of the connecting clip away from the base of the hinge when the case cover is in the act of being closed or opened, thus presenting a substantially frictionless and quietly operating connection.

Another object is to provide improved means for covering a spectacle case of the above character, which covering operation can be at least partially performed at the time the hinge is assembled to the body portions of the case by inserting portions of the covering material between the hinge and said body portions so that when the projections on the hinge are inserted through openings provided therefor in the case body portions they will be simultaneously inserted through similar aligned openings which have been previously formed in the covering material, thus securely anchoring the covering to the case.

Further objects are to provide in a manner as hereinafter set forth a spectacle case which is comparatively simple in its construction, durable, and thoroughly efficient in its use.

Other objects and advantages of the invention will become apparent from the following description taken in connection with the accompanying drawing, in which.

Figure 1:
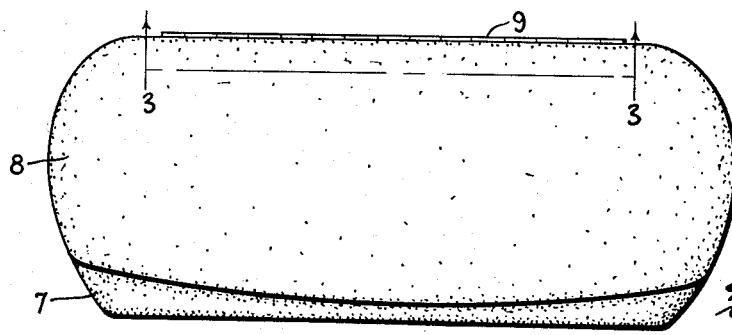
Fig. 1 is a top plan view of a spectacle case embodying the invention.
Figure 2:
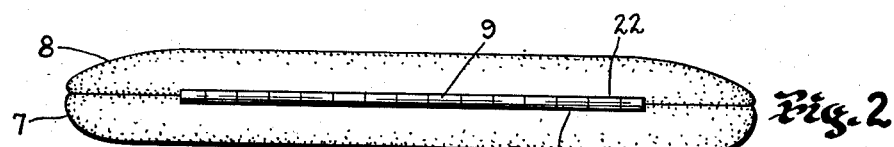
Fig. 2 is a rear elevational view of same.

Referring more particularly to the drawing wherein like characters of reference designate like parts throughout the several views, the device embodying the invention comprises a case having a pocket portion 7 and a cover portion 8 hingedly connected together by a hinge member 9. The pocket portion 7 and the cover portion 8 are formed of sheet metal such as aluminum, steel, silver, or other suitable material, being initially blocked out to the desired contour shapes and subsequently formed or cut by pressing or the like.

The hinge member 9 comprises upper and lower hinge plates 10 and 11 initially formed as flat elongated metal strips, the plates 10 and 11 being pivotally connected together by a hinge pintle 12 extending through spaced bearings 13 and 14 formed in the adjacent edges of the plates 10 and 11 respectively.

The marginal portion of the cover 8 to which the plate 10 is attached is provided with a plurality of recessed attachment portions 15 (Fig. 5) spaced throughout the area, the portions 15 being pressed inwardly of the material by means of a suitable die or the like in such a manner as to provide recesses 16 immediately thereabove having openings 17 communicating therewith. A similar number of projections 18 are formed in the hinge plate 10, the projections 18 being stamped out from depressed areas 19 which are aligned with the recessed portions 15 and in which the said portions 15 are adapted to reside when securing the plate 10 to the cover 8, the projections 18 extending through the openings 17 and having portions 20 bent or folded so as to lie in the recesses 16, the projections being of a size and shape as to occupy substantially the entire area of the recesses, the outer exposed surfaces of the portions 20 lying within the recesses 16 being substantially flush with the adjacent surface of the marginal portion of the cover 8.

Figure 5:
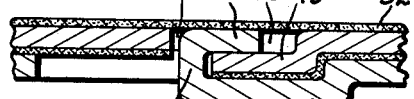
Fig. 5 is a sectional view taken on line 5—5 of Fig. 3.

The hinge plate 11 is provided with somewhat similar attachment means for securement of the hinge plate 11 to the pocket 7, the plate 11 being provided with depressions 21 adapted to receive interfitting raised portions formed on the pocket 7 and having projections struck out of either side of the depressions 21, which projections are adapted to extend through openings formed on either side of the raised portions on the pocket and to be folded or bent into the recesses behind said raised portions so as to present a substantially smooth even surface as in the attachment means shown in Fig. 5.

The cover and pocket portions 7 and 8 of the case are each provided with longitudinal recessed edges 22 and 23 in which the bearings 13 and 14 of the hinge plates 10 and 11 are adapted to be positioned, the bearings 13 and 14 being the only parts of the hinge which are visible externally of the case when the cover is in closed position.

Figure 3:
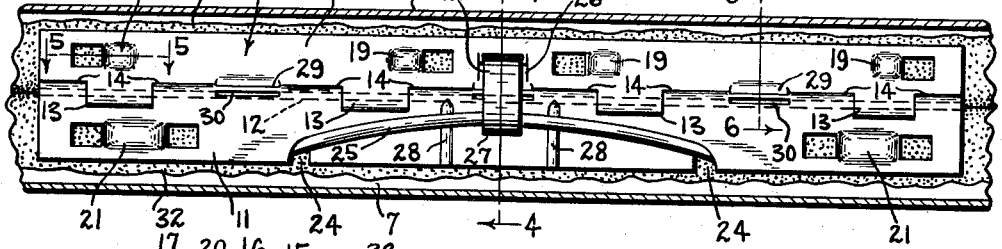
Fig. 3 is a fragmentary sectional view of the case taken on line 3—3 of Fig. 1 showing the hinge in assembled relation with the case pocket and cover portions.

The lower hinge plate 11 secured to the pocket portion 7 of the case is provided with a pair of spaced notches 24 in which the ends of a bar spring member 25 extend, as illustrated in Fig. 3. The upper hinge plate 10 attached to the cover 8 is provided with an intermediate forwardly extending latch portion 26 (Fig. 4) for reception of one end of a resilient clip 27, which clip 27 is arcuately shaped, one end having a portion adapted to hook over the edge of the latch portion 26 and the other end being adapted to hook about the intermediate portion of the bar spring member 25, thereby providing means to yieldingly urge the cover 8 into open or closed relation with the pocket 7.

This latter spring arrangement is of the conventional type employed in cases of this character and functions generally in the conventional manner. However, there is provided spacing means whereby the spring member 25 and the end of the clip 27 hooked about the spring member 25 are retained in a position away from engagement with the surface of the hinge plate 11. This means comprises a pair of spaced ribs 28 which are formed on the hinge plate 11 by stamping or other suitable procedure, the ribs 28 being located at either side of the clip member 27 and serving to space the spring member 25 and the adjacent end of the clip 27 away from the surface of the hinge plate 11 and consequently to prevent friction between the end of the clip 27 and the hinge plate 11 during the process of moving the cover into and out of the open position illustrated in dotted outline in Fig. 4.

Figures 4, 6:
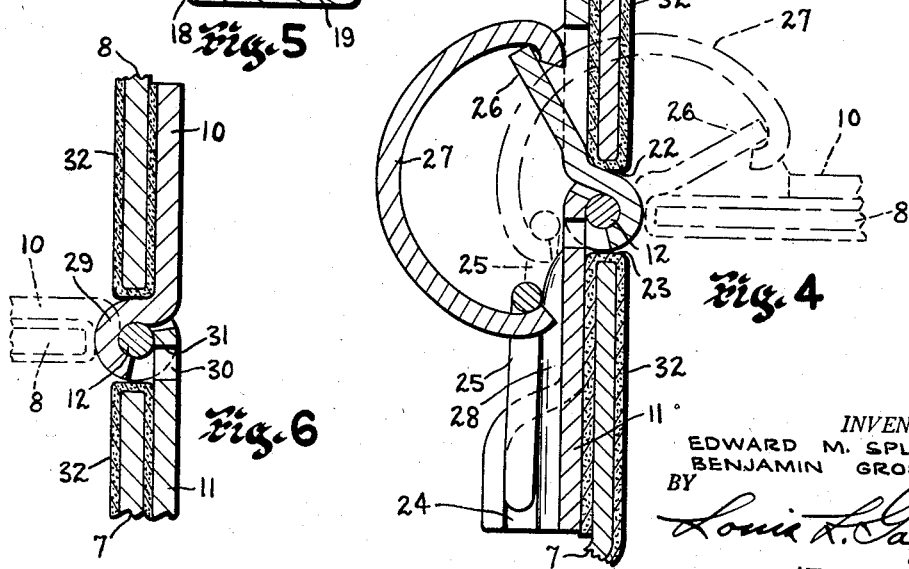
Fig. 4 is a sectional view taken on line 4—4 of Fig. 3.
Fig. 6 is a sectional view taken on line 6—6 of Fig. 3.

Means is also provided for limiting the open position of the cover 8, this means comprising a plurality of spaced downwardly projecting lips 29 formed on the lower edge of the hinge plate 10 (Fig. 6). The lips 29 are formed similar to the bearings 13 but are inclined rearwardly and partially encircle the pintle 12. Near the upper end of the lower hinge plate 11 stop means such as slots 30 are provided adjacent each lip 29 so that in opening the cover 8 to the position shown in dotted outline in Fig. 6 the ends of the lips 29 will enter the slots 30 and will abut against the top edges 31 of the slots, thus limiting the open position of the cover. It will be understood that such means are entirely independent of the spring tension device.

After initially shaping the cover 8 and pocket 7 and before attaching the hinge 9 thereto, a flexible covering 32 of genuine leather, imitation leather, fibre, cloth or other suitable material is provided for covering the entire outer exposed area of the pocket 7 and cover 8, the covering 32 being secured throughout the entire areas thereof by an adhesive or other suitable means in the usual manner. The pocket 7 and cover 8 are provided with the flexible cover 32 separately of each other. The covering 32 is turned inwardly of the pocket and cover throughout their entire peripheral edges and is thereby provided with a portion lying between the hinge plates 10 and 11 and the adjacent marginal portions of the case pocket and cover. The portion of the covering 32 lying between the hinge plate 10 and the case cover 8 is provided with a plurality of suitable openings substantially aligned with the openings 17 through which the hinge projections 18 are adapted to extend, similar openings being provided in the portion of the covering 32 between the hinge plate 11 and case pocket 7 adjacent the attachment means for the plate 11. The covering 32 is thus firmly anchored when the hinge plates 10 and 11 are assembled with the case pocket and cover 7 and 8.

The case is provided with the usual lining of flexible material such as velvet or the like secured internally of the case by a suitable adhesive in the conventional manner. This lining may be formed in one piece extending throughout the interior of the cover over the hinge member and throughout the interior of the pocket portion so that the hinge attachment means and spring actuating means are entirely concealed from view.

From the foregoing description it will be seen that simple, efficient and economical means and method have been provided for accomplishing all of the objects and advantages of the invention.

While certain novel features of the invention have been shown and described and are pointed out in the annexed claims, it will be understood that various omissions, substitutions and changes in the forms and details of the embodiment illustrated may be made by those skilled in the art without departing from the spirit of the invention.

We claim:

1. A device of the character described comprising a pocket portion and a cover portion, hinge means including bearing portions at the adjacent edges of said pocket and cover portions and a pintle extended through said bearing portions for hingedly connecting said pocket and cover portions, spring means for yieldingly retaining said cover portion in open or closed relation, and stop means independent of said spring means for limiting the open position of said cover portion with respect to said pocket portion, said stop means including a lip partially encircling the pintle and responsive to rotation of the cover about said pintle, a slotted portion carried by the pocket portion and in alignment with said lip to receive the free end thereof, and said slotted portion having a wall in the line of movement of said free end of the lip about the pintle to limit the extent of rotation of the cover.

2. A device of the character described comprising a pocket and a cover, and hinge means for coupling said pocket and cover comprising a pair of hinge plates having means at adjacent edges thereof for hingedly coupling the same, one of said plates overlying one surface of a marginal portion of said pocket and the other of said plates overlying one surface of a marginal portion of said cover, said marginal portions each having portions depressed to provide a raised portion on the surface thereof toward the plate and a recess in the opposed surface and at least one opening communicating with each depressed portion, said hinge plates having recessed portions interfitting with said raised portions and having projections formed integral therewith, said projections extending through said openings in the marginal portion of the respective cover and pocket, and with the end portion thereof lying within said recesses on the opposed surface of the marginal portion and each presenting a surface substantially flush with said opposed surface of the marginal portions.

3. A device of the character described comprising a pocket and a cover, a hinge for coupling said pocket and cover comprising a pair of hinge plates having interfitting bearing portions at adjacent edges thereof and a pintle extending through said bearing portions for hingedly connecting said hinge plates, one of said hinge plates being secured to said pocket and the other to said cover, and stop means for limiting the open position of said cover with respect to said pocket comprising a lip portion formed on one of said hinge plates and partially encircling the hinge pintle, the other of said hinge plates having a slot formed therein adjacent said lip portion and in alignment therewith to receive the free end of said lip when the cover is rotated about the pintle to an open position, and said slot having a wall portion in the line of movement of the free end of said lip to limit the extent of rotation of said cover.

4. A device of the character described comprising a pocket and a cover, hinge means for hingedly coupling said pocket and cover comprising a pair of hinge plates, one secured to the cover and the other to the pocket, and having means at the outer edges thereof for hingedly coupling the same, and spring means for yieldingly retaining the cover in open or closed relation comprising a spring bar member having its ends retained in spaced notches formed in the inner edge of one of said hinge plates, a clip member having one end extended about the center portion of said spring member, the other plate having a centrally disposed integral projection struck from the body thereof to form a latch for receiving the other end of the clip, and rib-like projections pressed from the body of the hinge plate carrying said spring member to space said spring member and said clip away from the surface of the hinge plate.

5. A device of the character described comprising a pocket and a cover, hinge means for hingedly coupling said pocket and cover comprising a pair of hinge plates, one secured to the cover and the other to the pocket and having means at adjacent edges thereof for hingedly coupling the same, spring means for yieldingly retaining the cover in open or closed relation comprising a spring bar member having its ends retained in one of said hinge plates, a clip member having one end secured to the intermediate portion of said spring member and having its other end attached to the other hinge plate, and spacing means comprising a pair of laterally extending ribs stamped from the body of said hinge plate on either side of said clip member and of sufficient height to serve, by holding the spring member away from the surface of the hinge plate, to prevent friction between the adjacent end of the clip member and said surface.

6. A device of the character described comprising a pocket and a cover, and hinge means for coupling said pocket and cover comprising a pair of hinge plates having means at adjacent edges thereof for hingedly coupling the same, one of said plates overlying the inner surface of a marginal portion of said pocket and the other of said plates overlying the inner surface of a marginal portion of said cover, said cover and pocket each having a covering of flexible material on the outer surface thereof with said material folded about the peripheral edges thereof and having portions interposed between said marginal portions and the overlying hinge plates, said marginal portions each having raised portions on the inner surface thereof and depressions on their outer surface in alignment with said raised portions and at least one opening communicating with each raised portion and aligned depression, said interposed portions of the covering having openings formed therein substantially aligned with the openings in said depressions, said hinge plates having recesses interfitting with the raised portions in said marginal portions and having projections formed integral therewith and extending through said openings in the marginal portions of the respective pocket and cover and interposed portions of the covering, the end portions of said projections being bent and lying within said depressions and presenting surfaces substantially flush with the surface of the marginal portions.

7. A device of the character described comprising a pocket and a cover, and hinge means for coupling said pocket and cover comprising a pair of hinge plate portions having means at adjacent edges thereof for hingedly coupling the same, one of said hinge plate portions overlying a side surface of an attachment portion of said pocket and the other of said hinge plate portions overlying a side surface of an attachment portion of said cover, said attachment portions and hinge plate portions having alignment means for positioning a respective hinge plate portion with respect to the attachment portion with which it is secured and means for securing a hinge plate portion with a respective attachment portion embodying projections formed integral with one of said portions and aligned openings provided in the other portion, said projections being extended through said openings and bent to overlie the opposed surface of said portion having the openings therein.

8. A device of the character described comprising a pocket and a cover, hinge means for coupling said pocket and cover comprising a pair of hinge plates having interfitting bearing portions at adjacent edges thereof and a pintle extending through said bearing portions for hingedly connecting said hinge plates, one of said hinge plates overlying the inner surface of a marginal portion of said pocket and the other of said hinge plates overlying the inner surface of a marginal portion of said cover, the outer surface of said marginal portions each having depressions formed therein with at least one opening communicating with each depression, said hinge plates having projections formed integral therewith and extending through said openings, said projections being bent over so as to reside within said depressions and present surfaces substantially flush with the adjacent outer surface of the marginal portions, stop means for limiting the open position of said cover with respect to said pocket comprising an extended portion formed on one of said hinge plates, the other of said hinge plates having a slot formed therein adjacent the extended portion of said first hinge plate, said extended portion partially encircling said pintle and, when the cover is at the limit of its open position, being positioned within said slot and in abutment with the edge thereof, spring means for yieldingly retaining the cover in open or closed relation comprising a spring bar member having its ends retained in one of said hinge plates, a clip member having one end secured to said spring member and having its other end attached to the other hinge plate, and spacing means comprising a pair of ribs formed on the surface of the hinge plate carrying the spring member on either side of said clip member and of sufficient height to serve, by holding the spring member away from the surface of the hinge plate, to prevent friction between the adjacent end of the clip member and said surface.

9. A device of the character described comprising a pocket and a cover, hinge means for coupling said pocket and cover comprising a pair of hinge plates having interfitting bearing portions at adjacent edges thereof and a pintle extending through said bearing portions for hingedly connecting said hinge plates, one of said hinge plates overlying the inner surface of a marginal portion of said pocket and the other of said hinge plates overlying the inner surface of a marginal portion of said cover, the outer surface of said marginal portions each having depressions formed therein with at least one opening communicating with each depression, said hinge plates having projections formed integral therewith and extending through said openings, said projections being bent over so as to reside within said depressions and present surfaces substantially flush with the adjacent outer surface of the marginal portions.

10. A device of the character described comprising a pocket, a cover, and hinge means for coupling said pocket and cover comprising a pair of hinge plates hingedly connected together, one of said hinge plates overlying the surface of a marginal portion of said pocket and the other of said hinge plates overlying the surface of a marginal portion of said cover, the opposed surface of said marginal portions each having depressions formed therein with at least one opening communicating with each depression, said hinge plates having projections formed integral therewith and extending through said openings, said projections being bent over so as to reside within said depressions and present surfaces substantially flush with the adjacent surface of the marginal portions.

EDWARD M. SPLAINE.
BENJAMIN GROSVENOR.

REFERENCES CITED

The following references are of record in the file of this patent:

UNITED STATES PATENTS

| Number | Name | Date |
|---|---|---|
| 1,200,793 | Anderson et al. | Oct. 10, 1916 |
| 1,308,935 | Cook | July 8, 1919 |
| 2,126,049 | Shiffman et al. | Aug. 9, 1938 |
| 2,246,598 | Osborne | June 24, 1941 |
| 2,376,487 | Jerry | May 22, 1945 |
| 2,425,540 | Kaplan | Aug. 12, 1947 |

FOREIGN PATENTS

| Number | Country | Date |
|---|---|---|
| 720,675 | France | Dec. 4, 1931 |